Aug. 8, 1944.   R. S. NILSSON   2,355,462
CALCULATING MACHINE
Filed Nov. 4, 1942   2 Sheets-Sheet 1
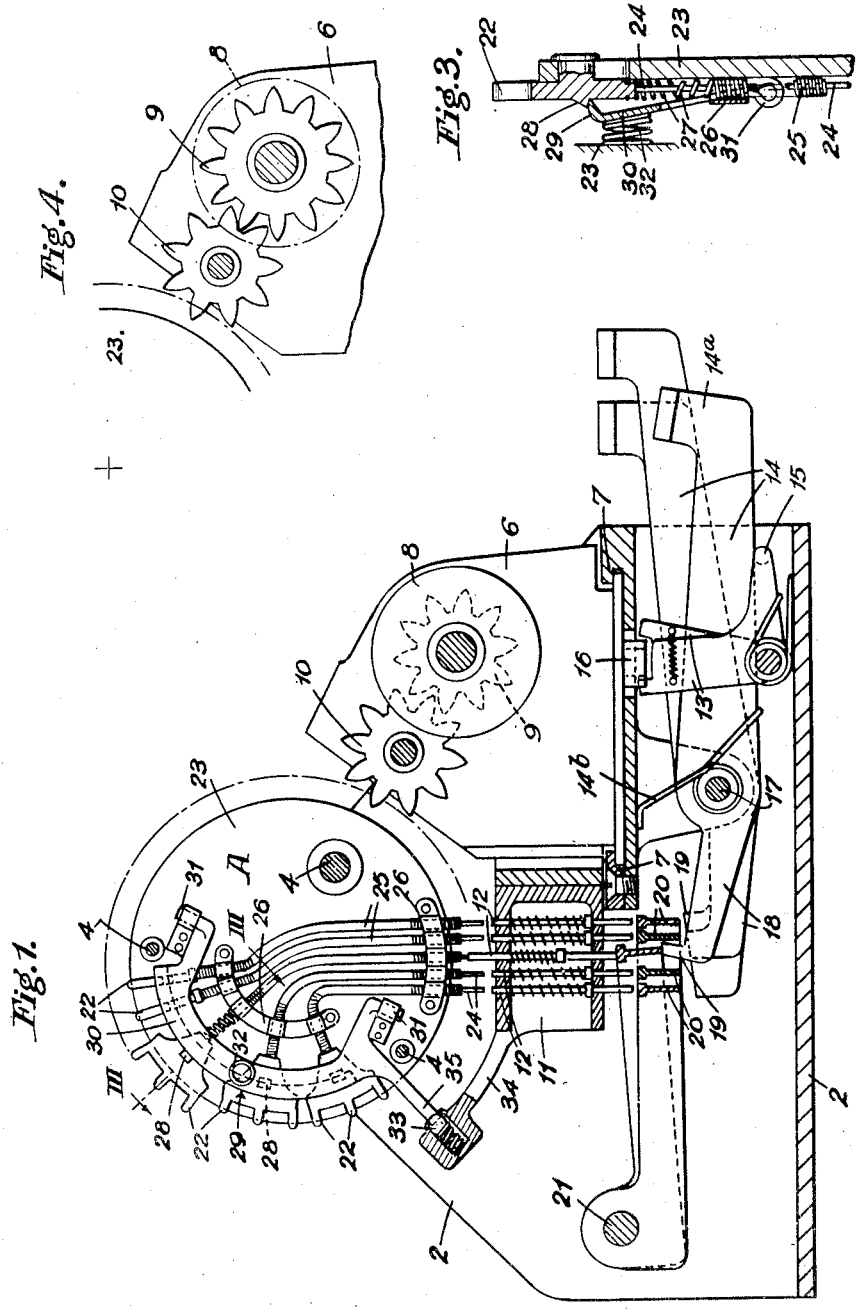
INVENTOR
ROBERT S. NILSSON
By Wallau Peters & Groff Attys Aug. 8, 1944.  R. S. NILSSON  2,355,462
CALCULATING MACHINE
Filed Nov. 4, 1942  2 Sheets-Sheet 2

INVENTOR
ROBERT S NILSSON

Patented Aug. 8, 1944

2,355,462

UNITED STATES PATENT OFFICE 2,355,462

CALCULATING MACHINE

Robert Severin Nilsson, London, England

Application November 4, 1942, Serial No. 464,469
In Great Britain March 17, 1941

1 Claim. (Cl. 235—79)

This invention relates to calculating, accounting and similar machines of the general kind comprising a plurality of coaxial actuating wheels provided with radially movable teeth, means for causing a selected number of said teeth to project from and to be withdrawn into said wheels, and an accumulator to which values according to the number of teeth caused to project are transmitted from the actuating wheels when same are rotated, the projecting teeth acting as gear teeth and co-operating with gear wheels entrained with the accumulator gears of the accumulator mechanism. The accumulator mechanism is mounted on a carriage adapted to be advanced step-by-step alongside the actuating wheels so that the requisite number of accumulator wheels are brought into operation according to the number of actuating wheels which have been set.

In this known kind of calculating machine the means for setting the radially movable teeth usually comprise some form of cam system as for example a cam disc having a slot composed of two circumferentially offset coaxial arcuate portions of different radii interconnected by an inclined portion forming the cam, the teeth being mounted in radial grooves of a circular plate and each having a lateral projection engaging in the slot of the cam disc, the disc, plate and teeth forming a setting wheel. The means for operating the setting wheel heretofore proposed consist of a radial arm projecting from the periphery of the cam disc, whereby the latter can be rotated by hand with reference to the plate, during which operation the inclined portion of the slot acts upon the said lateral projections of the teeth causing same to move from one arcuate slot portion into the other, thereby advancing or withdrawing the teeth.

It is also known, however, with machines of the foregoing general kind, to substitute simpler devices for the comparatively complicated cam system method of setting the teeth and at the same time to perform the teeth setting operation from a bank of keys, and the present invention adopts such a substitution and key operation and has an improved and sturdy construction of transmission means between the teeth and setting devices operated by the keys.

According to the invention the teeth of the settable actuating wheels, in calculating and like machines of the kind referred to, are set up by means of a bank of keys each of which operates an appropriate setting stud or studs mounted in a setting carriage adapted to be advanced step by step as successive keys are depressed so as to locate itself progressively in alinement with each actuating wheel in such a position that the said studs, as they are operated, selectively engage elements which respectively form part of a plurality of transmission means carried by the particular actuating wheel and connected each with a tooth or tooth-group of said wheel, whereby the keys through the studs and transmission means effect the setting up of selected teeth of the actuating wheel. The said transmissions on each of the actuating wheels are preferably lengths of Bowden cable one end of the respective core wires of which project over the periphery of the wheel to constitute the elements which engage the aforesaid setting studs.

The invention is applicable to working on the decimal system wherein transfer from order to order is effected in tens throughout the whole range, or just as readily to the pound, shilling and pence coinage system wherein transfer from the lowest order is effected in fours (farthing, halfpenny, three-farthings, whole penny) from the next in twelves (one penny onwards transferring after eleven-pence), from the next in tens (shilling units), from the next in twos (after a nineteen-shilling total), and thence on to pure decimal transfer for the pounds.

In order that the invention may be clearly understood an embodiment thereof will now be more particularly described, by way of example, with reference to the accompanying drawings, wherein—

Figure 1 is a diagrammatic transverse section of a calculating machine according to the invention on the line I—I of Figure 2, showing the essential parts;

Figure 3 is a section to an enlarged scale on the line III—III of Figure 1 of part of an actuating wheel and a slidable tooth group;

Figure 4 shows the transmission gear between the actuating wheel and the accumulator wheel.

Figure 2:
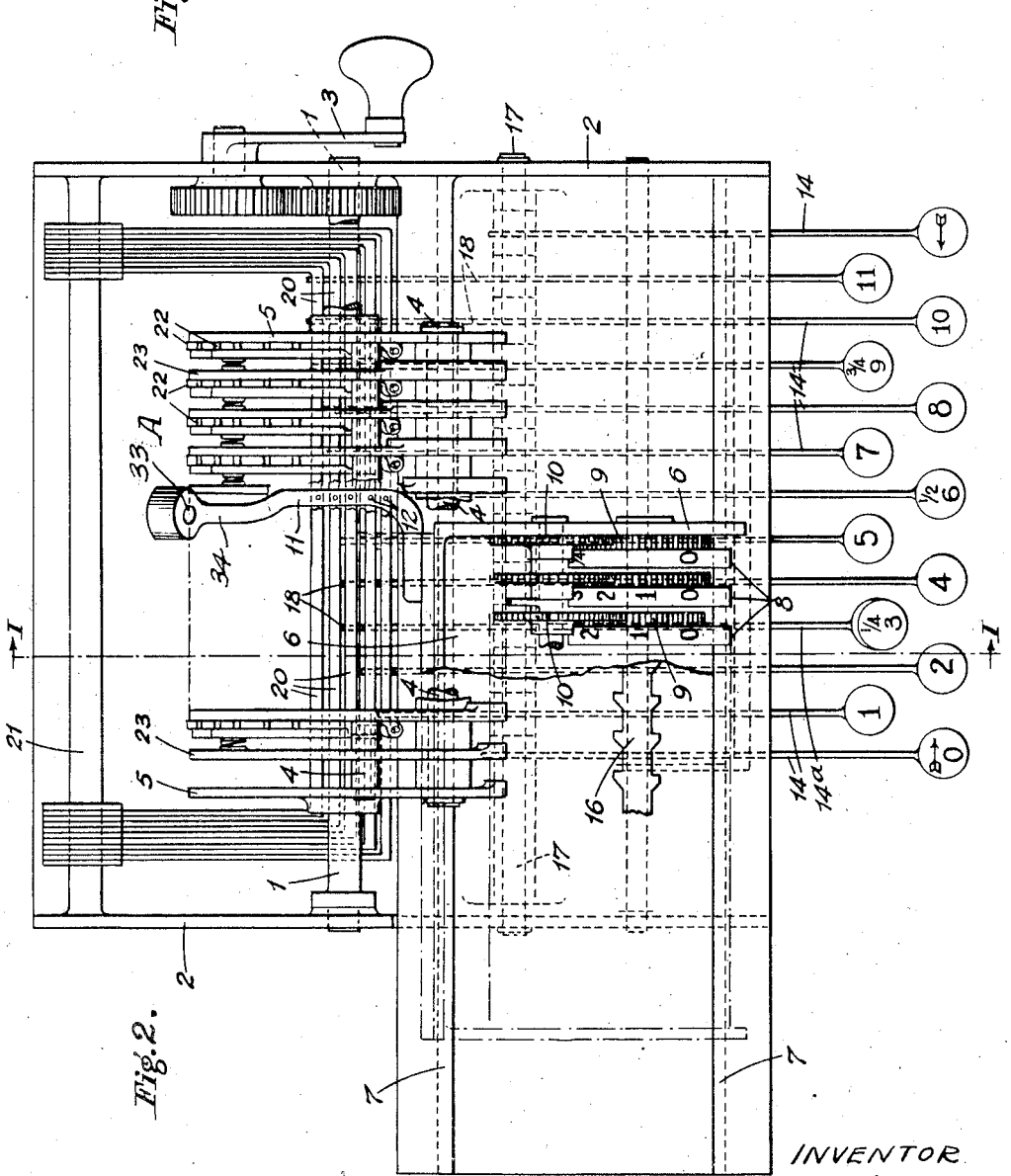
Figure 2 is a plan view with some parts omitted for clearness.

Referring to the drawings, the co-axial shafts 1 (Figure 2) are rotatably mounted in the machine frame 2 and are operable by a handle 3 or an electric motor. Coaxially with shafts 1 a plurality of actuating wheels, generally indicated at A in Figures 1 and 2, are mounted on parallel rods 4 carried fixedly by end plates 5 (Figure 2)

rotatable with the shafts. Any suitable number of actuating wheels may be provided in accordance with the desired capacity of the machine. Each actuating wheels is provided with eleven settable teeth to deal with pounds, shillings and pence; for decimal systems only nine teeth would be necessary. These teeth and their operation are described later in this specification.

A carriage 6 is mounted to travel from side to side of the machine in the slide-ways 7 of the frame 2. On this carriage are mounted the accumulator wheels 8 fixed to accumulator pinions 9, and intermediary pinions 10 which mesh with whatever teeth may have been set on the actuating wheels A.

This carriage 6 is formed with a rigidly projecting setting carriage 11 which is in the form of a comparatively narrow box-like structure extending rearwardly underneath the actuating wheels A, and wide enough to carry a single row of setting studs 12 aligned transversely of the machine and symmetrically disposed under the center of the wheels A. The setting carriage 11 therefore advances step by step with the main carriage 6. The movement of the carriage 6 from left to right (with reference to Figure 2) is brought about by a suitable spring-drum device, not shown, in any suitable or known way, under the control of an escapement 13, upon operation of any of the keys marked "0" to "11." The key marked with an arrow pointing to the left operates any suitable kind of back spacer. Reference to Figure 1 will show that the key bars 14, when depressed to the position of the depressed key 14ª engage a common escapement-operating bar 15 extending across the machine to release in known manner one of the pawls of the escapement 13 which engage the rack 16 on the carriage 6.

The setting studs 12 are slidably and vertically mounted in the setting carriage 11 and are spring depressed to a normal withdrawn position. The key bars 14 are pivoted on a common shaft 17 and are formed with rearward arms 18 having toes 19 to engage one or more of the setting bars 20 (according to the key in operation). Each of the setting bars is part of a respective U-shape frame pivoted to the shaft 21. Depression of a key to the position shown at 14ª raises the arm 18 and the toe 19 pushes up a setting bar or bars 20 which in turn push up an appropriate setting stud or studs 12. The key bars are returned by a spring 14ᵇ, and the setting studs 12 by their respective springs located in the setting carriage 11, after the studs have performed their tooth-setting function on the actuating wheel A as described later.

Each of the actuating wheels A is provided with eleven teeth 22 slidable radially on the actuating wheel disc 23, the latter being threaded on the rods 4 as previously described. The right-hand end plate 5 is the equivalent of the disc 23 for the right-hand wheel. The teeth may be separate single teeth, but to economise with parts and space and to simplify the mechanism it is preferred to group the teeth as follows. Three groups are made as three-tooth units so as to be operable three teeth at a time, and the remaining two teeth are single units. From such a combination any number of teeth from one to eleven may be set. This will be clearly understood by reference to Figure 5 described later. By this grouping arrangement only five operating transmissions connecting the teeth to projecting elements on the periphery of the wheel are necessary, and only five setting studs 12, and five setting bars 20.

The grouping arrangement would be varied when the machine is constructed to operate solely on the decimal system. For example, the teeth would be grouped advantageously in four groups of two, three, three and one, from which combinations can be made up from which any number from "1" to "9" can be set. In consequence the operating transmissions, setting studs 12, and setting bars 20 could in this case be reduced from five to four.

To the inner end of each tooth 22 or each three-tooth group is connected the core wire 24 of a Bowden cable, the sheath 25 of which is rigidly clamped to the disc 23 at 26. At the end where the cable is joined to the tooth units the sheath 25 is left free for attachment to the tooth unit and to act as a spiral tension spring as depicted at 27 in Figure 3. By this means the wire core 24 can be pushed through the sheath so as to set the appropriate tooth 22 (or tooth group) against the influence of the sheath at 27 acting as a return spring.

The teeth are retained in their set or projected position by latches 28 which pass and then engage the inturned lip 29 of an arcuate locking plate 30 pivoted at 31 to the disc 23. This locking plate is pressed towards the teeth by the compression spring 32 disposed between the plate and the adjacent disc 23. All projected teeth are released when the setting carriage 11 is pushed from right to left (referring to Figure 2) when a ball-stud 33 on an arm 34 of the carriage engages a finger 35 on the locking plate. When the carriage moves step by step in the opposite direction the ball-stud only presses the locking plates harder on to the tooth units and eventually wipes past, the ball-stud being resiliently depressible.

Figure 5:
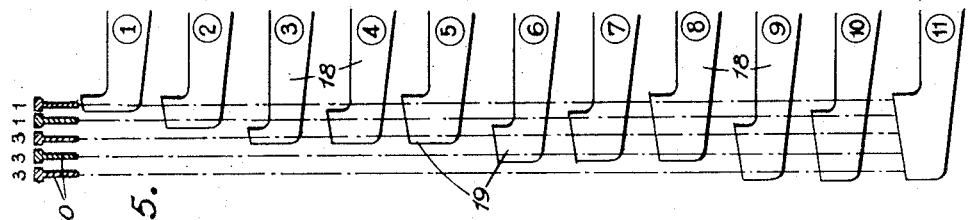
Figure 5 is a diagram showing how each digit key of the bank seen in Figure 2 co-acts with the setting stud selector bars (described later) to set up the appropriate number of teeth in the various actuating wheels.

Referring to Figure 5, the diagram shows the toes 19 of all the key bar arms 18 spaced out of the same general horizontal plane which they normally occupy in order to indicate how each key is designed to co-operate with the setting studs 12 through the intermediary of the setting bars 20 to set a correct number of teeth 22 according to the value of the key. The key bar arms 18 have for convenience been marked with their respective values "1" to "11" corresponding with the marking on their keys as seen in Figure 2. It will be clear from an inspection of Figure 1 that the three rear studs 12 push on cables 24 which each controls three teeth 22, whilst the remaining two forward studs 12 push on cables 24 which each controls a single tooth 22. Similarly, to each setting bar 20 there may be ascribed similar tooth values of 3, 3, 3, 1, and 1 from rear to front as these bars actuate the respective studs above them. Thus the values marked in Figure 5 above the setting bars 20 will be readily understood as indicating the number of teeth operable by each bar. From different combinations of these values of "threes" and "ones" any of the key values of "1" to "11" can be made up. The toes 19 are accordingly shaped to engage one or more of the bars 20 to select bars totalling the tooth value corresponding to the key. For example, key "1" engages only the outside "1" value bar, key "3" one of the "3" value bars, key "11" all the bars, and so on. In Figure 1 key "3" designated 14ª is shown in operation pressing up the central bar 20 for setting up three teeth 22.

The projecting radial teeth 22 of the actuating wheels A act upon gears 9 fixed to each accumulator wheel, through the aforesaid intermediate gears 10, the usual type of transfer mechanism being employed for carrying tens, hundreds or other denominations from one accumulator wheel to another. In the machine herein described and illustrated by way of example (being constructed for calculation in pounds, shillings, pence and farthings), the two accumulator units on the right-hand end of the carriage are geared according to Figure 4, the accumulator pinion having twelve teeth and the intermediary pinion nine teeth. All the remaining pinions have ten teeth each as in Figure 1. Referring to Figure 4 it will be plain that transfer in any known manner from the accumulator disc 8 on the extreme right-hand of the carriage to the accumulator disc next in the series will be effected at the conclusion of a full revolution of twelve teeth of the pinion 9, so that if three-tooth part revolution is given for each farthing (by the operation of an appropriate key as set forth later), a transfer to the pence will take place on the fourth operation (i. e., ¼d.+¼d.+¼d.+¼d.). Similarly, with the halfpenny key arranged to effect a six-tooth step of the pinion 9, and the three-farthing key a nine-tooth step, a complete twelve-tooth revolution will always take place on the completion of any fractions of a penny totalling one unit. The counter immediately next to the aforesaid fractional penny counter is also controlled by a twelve-tooth pinion 9 for totalling the whole pence up to eleven, then transferring to the shilling digit disc. Thus, as will be seen in Figure 2, the "¼d." is marked on key value "3," the "½d." on key value "6," and the "¾d." on key value "9."

Of course, an accumulator mechanism may be provided to suit any desired calculation to be made, for example in the decimal system only, moreover, the carriage may be interchangeable, so that the same machine may be utilised for calculation in various systems.

Before setting up the number in the setting wheel A by the operation of the keyboard as will be described hereinafter, the carriage is moved to the extreme left. Whenever a key is depressed, the escapement mechanism 13 is operated to permit the carriage to move one step to the right under the action of the usual spring, the arrangement being such that the movement of the carriage takes place when the key is released. The length of the step made by the carriage corresponds exactly to the spacing of the setting wheels A. When the carriage is pushed to the extreme left before the commencement of the setting-up operation, the accumulator wheel 8 on the extreme right is exactly one step to the left of the actuating wheel A on the extreme left. Further, the selector carriage 11 is so mounted that when the carriage 6 is in said extreme left position, said carriage 11 is exactly in register with the cable wires 24 on the extreme left. Consequently, when a key is depressed after the carriage has been moved to the extreme left, the selector devices 20, 12, 24 will be acted upon, and the number of teeth 22 corresponding to the said key will be set up in the actuating wheel A on the extreme left, and when the key is released the carriage will move one step to the right in such a manner that the accumulator wheel 8 on the extreme right is opposite the actuating wheel A on the extreme left, the projecting teeth of the actuating wheel being in the same vertical plane as the gear 10 meshing with gear 9 of the accumulator wheel 8, so that by the rotation of the actuating wheel assembly the number of the teeth set up in the actuating wheel on the extreme left can be transferred to the accumulator wheel 8 on the extreme right.

If a number of several figures is to be set up, the carriage 6 will move one step to the right after release of each key corresponding to the figures of the number as same is set up starting with the figure of the highest denomination, and thus the figures will be set up in consecutive actuating wheels A from the left to the right. The number is transferred to the accumulator mechanism as a whole by imparting a revolution to the assembly of actuating wheels. A nought key is provided at one end of the keyboard (Figure 2) and may be duplicated at the other end. The only function of the nought key is to operate the escapement mechanism to miss setting one of the actuating wheels A when the number to be set up contains a nought.

The actual operation of setting up the number will now be described.

Assuming that it is desired to set up the numeral "3," the carriage is pushed to the extreme left as mentioned and the "3" key is depressed, this being the key illustrated as depressed in Figure 1. The depression of this key results in the following operations being performed:

The arm 18 is raised, the setting bar 20 is raised thereby, the central setting stud 12 is pushed up by the bar against its spring resistance, the core wire 24 of the central Bowden cable 25 is moved through its sheath to project and set the three-tooth group. The latter is locked in the set position by the plate 30. The escapement mechanism is actuated by the key-bar 14.

As explained when the "3" key is released the projecting teeth 22 of the actuating wheel A on the extreme left will be in the plane of the gears 9 and 10 associated with the accumulator wheel 8 on the extreme right, so that upon subsequent rotation of the actuating wheel assembly the three projecting teeth 22 will impart partial rotation to the accumulator gear 9 corresponding to the numeral represented by the key depressed, so that if, for example, the accumulator mechanism were constructed for the decimal system, the numeral "3" would appear on the accumulator wheel through a window formed in a cowl (not shown) placed over the accumulator mechanism in usual manner. Successive operations resulting in a total exceeding "9" on the accumulator wheel will result in a transfer to the next higher adjacent accumulator wheel by transfer mechanism in known manner.

In the present instance, where the accumulator wheel on the extreme right represents farthings, the operation of transferring the setting to the accumulator mechanism will cause rotation of the accumulator wheel and also, when a total of "3" is exceeded, the operation of the transfer mechanism between the adjacent accumulator wheels, so that four farthings will be carried as one penny, zero appearing on the accumulator wheel 8 instead of "4" and "1" on the next succeeding accumulator wheel.

It will be quite clear from the foregoing how different items in pounds, shillings, pence and farthings can be set up in succession in the present calculating machine and how such items can be added together, or one deducted from another (by rotating the actuating wheel assembly in an appropriate direction) and so forth.

After a number or item has been duly set up and transferred to the accumulator mechanism, and before setting up a new number or item, the actuating wheel assembly must be returned to its initial position.

It will be seen that the keyboard type of calculating machine herein described is suitable for speeding up considerably the operation of the machine as compared with the known machines. It is to be observed that in the particular embodiment described, which is equipped for calculation in pounds, shillings, pence and farthings, care must be taken to depress the nought key, apart from times when there are actual noughts in the items to be dealt with, in respect of each figure of an absent lower denomination if the item includes higher denominations. For example, if it is desired to set up £1 in the machine, it is necessary to depress the "1" key and then the "0" key four times, once in respect of tens of shillings, once in respect of units of shillings, once in respect of pence and once in respect of farthings. Adding for example 10 shillings to this amount would involve, after transfer of the previous amount to the accumulator mechanism, return of the actuating wheel assembly to zero and pushing the carriage to the extreme left, depression of the "1" key and then depression of the "0" key three times, once in respect of the units of shillings, once in respect of pence and once in respect of farthings. This will ensure that each item is correctly positioned for example for adding same to or deducting from an existing total.

Instead of the Bowden transmissions 24, 25, 26, 27 pivoted levers may be substituted mounted on the disc 23 and having an arm, stud, or other projection normally protruding past the periphery of the disc 23 in place of the wire end 24, and another arm of part of the transmission connected with the teeth or tooth groups.

It is to be understood that various features of construction may be varied without departing from the spirit of the invention, as for example the substitution of other transmissions for the Bowden cable devices as just referred to, variation of the arrangement of setting studs 12 altering the way the setting bars 20 are movably mounted on the framework 2, locating the setting carriage 11 at a position other than underneath the actuating wheels A, the substitution of different locking and release means for the tooth groups, and other less important mechanical revisions, all of which would constitute mechanical equivalents readily occurring to those skilled in the art.

I claim:

In a calculating machine, a plurality of rotatable actuating wheels, a plurality of tooth units mounted on each wheel for projection and retraction radially to operative and inoperative positions, respectively, relative thereto, sheaths individual to said tooth units secured to said wheels, a flexible wire extending through each sheath and connected at one end to the related tooth unit for projecting the same to its operative position, yieldable means tending constantly to retract said tooth units, a carriage, said carriage and said wheels being longitudinally movable relative to each other, key actuated studs carried by said carriage to press against the other ends of selected ones of said wires to shift them longitudinally in their sheaths to selectively project said tooth units to their operative positions, a latch element individual to each wheel and common to all of the tooth units carried thereby to hold any projected tooth unit in projected position, an accumulator mechanism operable by projected ones of said tooth units in response to rotation of said wheels, and means operable by longitudinal movement of said carriage and said wheels relative to each other to release said latch elements to permit return of projected ones of said tooth units to their normal retracted positions.

ROBERT S. NILSSON.